United States Patent [19]
Strehlow et al.

[11] Patent Number: 4,941,993
[45] Date of Patent: Jul. 17, 1990

[54] PROCESS FOR THE PRODUCTION OF CONDENSATION PRODUCTS WHICH CAN BE CONVERTED INTO GLASS

[75] Inventors: Peter Strehlow, Würzburg; Helmut Schmidt, Zellingen, both of Fed. Rep. of Germany

[73] Assignee: Fraunhofer-Gesellschaft zur Förderung der angewandten Forschung e.V., München, Fed. Rep. of Germany

[21] Appl. No.: 330,493

[22] Filed: Mar. 30, 1989

[30] Foreign Application Priority Data

Mar. 31, 1988 [DE] Fed. Rep. of Germany ....... 3811185

[51] Int. Cl.$^5$ ............................................... C09K 3/36
[52] U.S. Cl. .................................... 252/315.6; 501/12; 252/315.1; 252/315.5; 252/315.7
[58] Field of Search ............ 501/12; 252/315.3, 315.6, 252/315.7

[56] References Cited

U.S. PATENT DOCUMENTS 4,306,913 12/1981 Mabie et al. ........................... 501/12
4,714,567 12/1987 Roha ..................................... 501/12
4,797,232 1/1989 Aubert ................................... 501/12

Primary Examiner—Mark L. Bell
Assistant Examiner—Melissa Bonner
Attorney, Agent, or Firm—Oblon, Spivak, McClelland, Maier & Neustadt

[57] ABSTRACT

A process is described for the production of condensation products which can be converted into glass, in which at least one silicon compound which can be hydrolyzed to form $SiO_2$, at least one compound which can be hydrolyzed to form $Al_2O_3$, $B_2O_3$ or $TiO_2$ and at least one hydrolyzable alkali metal compound or alkaline earth metal compound is brought into contact with at least the stoichiometrically necessary amount of water. The hydrolysis is carried out according to the invention in the presence of a complexing agent selected from the group consisting of $\beta$-carbonyl carboxylic esters and $C_2$ to $C_5$ carboxylic acids and their carboxylate ions, which prevents precipitates of hydrolysis products of the very reactive aluminum and boron compounds forming while the less reactive silicon compounds remain unchanged or are only partially hydrolyzed. After drying, the condensation products prepared in this way can be sintered with thermal compaction to form glass without it being necessary at the same time to significantly excede the glass-transition temperature of the particular glass.

18 Claims, No Drawings

PROCESS FOR THE PRODUCTION OF CONDENSATION PRODUCTS WHICH CAN BE CONVERTED INTO GLASS

The present invention relates to the production of glass, in particular to a process for the production of condensation products which can be converted into glass.

In the conventional production of glass, the elements whose presence in the glass end product is desired are generally mixed in the form of solid compounds, for example the oxides, after which the resultant mixture is heated at high temperatures, in particular temperatures which are considerably above the glass-transition temperature of the resultant glass, in order to obtain a glass melt. When this melt is cooled to below the glass-transition temperature, however, the difficulty is encountered in many glasses having an increased tendency towards crystallization, such as, for example, barium aluminum silicate glasses, that crystallization processes set in during the cooling operation so that it is scarcely possible to obtain crystallite-free glass in systems of this type by means of cooling processes. It has therefore been attempted to circumvent these difficulties in the production of glasses which have an increased tendency towards crystallization by means of the sol-gel process. In this process, the elements whose presence in the glass end product is desired are employed in the form of hydrolyzable compounds, in particular the alkoxides, which are hydrolyzed in solution by addition of water to give polycondensates, which are then dried and calcined in a suitable manner. The calcined products can then be sintered at temperatures below or only slightly above the glass-transition temperature of the pertinent glass to give a glass. Temperature regions in which the glass melt has an increased tendency towards crystallization are thereby avoided. Unfortunately, however, the sol-gel process is also not completely without problems since the hydrolyzable compounds employed usually have various reactivities towards water so that the addition of water must be carried out in a manner such that, on the one hand, the highly reactive compounds are not hydrolyzed and condensed to an extent such that they precipitate out of the reaction system, i.e. out of the solution, and, nevertheless, the less reactive compounds are hydrolyzed substantially completely. Since it is obviously very difficult to satisfy these demands, the customary sol-gel process results in the formation of precipitates during hydrolysis and condensation, which generally does not result in glasses but instead in products which have crystallized, at least partly. This is because a prerequisite for the production of glasses are very homogeneous materials in which the individual components are distributed in the molecular region. The consequence of separation processes in sol phases is the production of crystalline products. If, in contrast, the occurrence of precipitates has been avoided by carrying out the reaction very carefully, glasses having a pre-specified stoichiometry can generally not be produced in this manner since, in this case, the less reactive (and usually also readily volatile) components, for example the silicate, has not yet been hydrolyzed completely or fixed to the network which is forming, and the unreacted part therefore volatilizes during the subsequent heating steps or even during the reaction so that less silicon is present in the end product than would be expected on the basis of the starting materials employed.

A solution of this problem, especially for glasses containing aluminum, boron and titanium, has been suggested in DE-B-1 941 191. In the sol-gel process described therein chelating agents are added to the solutions of compounds of these elements for the purpose of stabilization. Acetylacetone and triethanolamine are mentioned. The hydrolysis of the employed hydrolyzable compounds is effected in a diffusion controlled process, namely by the condensation of water from the humidity of the surroundung air.

This diffusion-controlled hydrolysis, however, has two major drawbacks: it slows down the sol-gel process considerably, and furthermore one cannot succeed in stoichiometrically incorporating the alkaline earth metals which act as network modifiers into the network in a larger proportion (approximately >5%).

If one tries to conduct the hydrolysis process in the above procedure in the usual manner of the sol-gel process by directly adding water instead of letting atmospheric humidity diffuse to the reaction mixture, metal complex compounds precipitate from the water containing solutions when the complexing agents of DE-B-1 941 191 are used. This results in the above-mentioned formation of crystalline products and products which do not satisfy the pre-specified stoichiometry.

The object of the present invention was therefore to provide a process for the production, by the sol-gel process, of condensation products which can be converted to glass which process allows the production even of glasses with a higher proportion of aluminum and/or boron and/or titanium and alkali and/or alkaline earth metals with a pre-specified stoichiometry under the conditions of accelerated hydrolysis by direct addition of water.

This object is achieved according to the invention by a process for the production of condensation products which can be converted to glass, which involves hydrolytic condensation of compounds of the elements whose presence in the glass end product is desired, which comprises bringing a solution containing (a) at least one compound of the general formula (I)

$$SiR_4 \qquad (I)$$

in which the radicals R, which may be identical or different, denote hydrolyzable groups or hydroxyl, and/or an oligomer derived therefrom;

(b) at least one compound of the general formula (II) or (III)

$$MR'_3 \qquad (II)$$

$$TiR'_4 \qquad (III)$$

in which M represents Al or B, and the radicals R', which may be identical or different, denote hydrolyzable groups or hydroxyl, and/or a hydrolyzable aluminum salt and/or an oligomer derived from these compounds; and (c) at least one hydrolyzable compound or at least one hydroxide, oxide or oxide hydrate of an element from the group comprising lithium, sodium, potassium, rubidium, cesium, beryllium, magnesium, calcium, strontium and barium, into contact with at least the amount of water which is stoichiometrically necessary for complete hydrolysis of the hydrolyzable groups present, in the presence of a complexing agent selected from the group consisting of β-carbonyl carboxylic esters and $C_2$–$C_5$ carboxylic acids and their carboxylate ions, and optionally in the presence of a condensation catalyst.

The reaction mixture prepared in this way is then, if appropriate, left or stirred for several hours, preferably at room temperature. The resultant product can then be freed in a suitable manner, in particular by treatment at elevated temperature (drying and calcination), from a volatile component and components which can be volatilized by thermal decomposition. The gel powder obtained in this way can then be sintered to form a glass in a manner known per se.

Suitable silicon compounds of the general formula (I) are all compounds which can be hydrolyzed to silicic acid by reaction with water. In addition, these compounds should be significantly soluble in the organic solvent used as the reaction medium, if one is used.

In the general formula (I), the radicals R may be identical or different and denote, for example, hydrogen, halogen, alkoxy, acyloxy, —NR"$_2$ (R" = H and/or alkyl), alkylcarbonyl or alkoxycarbonyl. Preferred radicals are those which result, on hydrolysis, in products which are readily volatile or can be volatilized by thermal decomposition below the glass-transition temperature of the glass end product desired. (This also applies to the radicals of the other compounds employed according to the invention, the species acting as complexing agent and the condensation catalyst optionally present and the solvent). Preferred radicals R in the formula (I) are therefore alkoxy, acyloxy, —NR"$_2$ (R" = H and/or alkyl) and/or hydroxyl, alkoxy groups and/or hydroxyl groups being particularly preferred.

The following applies to the abovementioned general definitions:

Alkoxy, acyloxy, alkylamino, dialkylamino, alkylcarbonyl and alkoxycarbonyl radicals are derived from straight-chain, branched or cyclic alkyl radicals having, for example, 1 to 20, preferably 1 to 10, carbon atoms, where lower alkyl radicals having 1 to 6, preferably 1 to 4, carbon atoms are particularly preferred. Specific examples are methyl, ethyl, n-propyl, isopropyl, n-butyl, sec.-butyl, tert.-butyl, isobutyl, n-pentyl, n-hexyl and cyclohexyl.

Specific examples of radicals R are methoxy, ethoxy, n- and i-propoxy, n-, sec.- and tert.-butoxy, isobutoxy, β-methoxyethoxy, acetyloxy, propionyloxy, monomethylamino, monoethylamino, dimethylamino, diethylamino, methylcarbonyl, ethylcarbonyl, methoxycarbonyl and ethoxycarbonyl.

The abovementioned alkyl radicals can of course optionally carry 1 or more substituents, for example halogen atoms, $C_{1-4}$-alkoxy radicals, nitro groups and aryl groups. In addition, the carbon chain can contain one or more double and/or triple bonds and can be interrupted by one or more hetero atoms, in particular O, S and N(R"). However, since the compounds produced from the group R on hydrolysis are not present in the end product desired (glass) and should also leave no traces, it is preferred that the radicals R selected are those which do not have an excessively high molecular weight and contain no atoms which remain in the end product.

Halogen denotes fluorine, chlorine, bromine and iodine, in particular chlorine.

Concrete examples of compounds of the general formula (I) are: $Si(OCH_3)_4$, $Si(OC_2H_5)_4$, $Si(n-OC_3H_7)_4$, $Si(i-OC_3H_7)_4$, $Si(OC_4H_9)_4$, $Si(OOCCH_3)_4$ and $Si(OOCC_2H_5)_4$.

Suitable components (b) according to the invention, i.e. Al, B, and/or Ti compounds, are, in particular, compounds which are soluble in the reaction medium used and can be hydrolyzed under acidic or basic conditions to give $Al_2O_3$, $B_2O_3$, $TiO_2$, or the corresponding hydroxides. If, in the general formula (II), M represents aluminum, the groups R', which may be identical or different, denote, for example, halogen, alkyl, alkoxy and/or hydroxyl. Particularly preferred radicals here are again alkoxy and/or hydroxyl groups. In addition, the groups mentioned are defined as already indicated for the silicon compounds. The other remarks which have been made in connection with the silicon compounds also apply correspondingly to the aluminum compounds.

If the aluminum compound is a hydrolyzable aluminum salt, this salt is derived from inorganic or organic acids, such as, for example, nitric acid, formic acid, acetic acid, propionic acid, oxalic acid, citric acid and trifluoromethanesulfonic acid. Particularly preferred salts are aluminum salts of acids which can readily be volatilized or decomposed thermally to form volatile products. This applies in particular to aluminum salts of nitric acid, formic acid, acetic acid, propionic acid, citric acid and trifluoromethanesulfonic acid. At the same time, the corresponding anion can optionally even take on the role of the complexing agent - alone or together with a separately added complexing agent. This applies, for example, to acetates and propionates.

Concrete examples of aluminum compounds which can be used according to the invention are $Al(CH_3)_3$, $Al(C_2H_5)_3$, $Al(i-C_3H_7)_3$, $Al(sec.-C_4H_9)_3$, $AlCl_3$, $Al(OCH_3)_3$, $Al(i-OC_3H_7)_3$, $Al(sec.-OC_4H_9)_3$, aluminum formate, aluminum acetate, aluminum propionate, aluminum citrate and aluminum nitrate.

It is of course also possible for oligomeric compounds derived from these monomeric compounds and compounds which have already been partially hydrolyzed or partially condensed to be used. This applies not only to the aluminum compound but also to the B and Ti compounds and other hydrolyzable components which may be present. If appropriate, oligomers having central atoms which are different from one another can also be employed.

If, in the general formula (II), M represents boron, the groups R' are, for example, halogen, alkoxy and/or hydroxyl groups, while in the compounds of the formula (III), R' denotes, in particular, halogen, alkoxy, acyloxy and/or hydroxyl. In these cases too, alkoxy and hydroxyl compounds are again particularly preferred. The remarks made regarding the radicals R in connection with the silicon compounds also apply correspondingly to the radicals R', in particular with respect to their meaning.

Concrete examples of B and Ti compounds which can be used (and are preferred) according to the invention are $B(OCH_3)_3$, $B(OC_2H_5)_3$, $B(OH)_3$, $TiCl_4$, $Ti(OC_2H_5)_4$, $Ti(n-OC_3H_7)_4$, $Ti(i-OC_3H_7)_4$, $Ti(OC_4H_9)_4$, $Ti(2-ethylhexoxy)_4$, and oligomeric compounds derived therefrom.

A compound of the formula II or III can be employed either alone or together with other compounds of the formulae II and III.

The component (c) used in the process according to the invention is at least one hydrolyzable compound of an element from the group comprising lithium, sodium, potassium, rubidium, cesium, beryllium, magnesium, calcium, strontium and barium. It is also possible to employ compounds of this type which have been partially or completely hydrolyzed as long as they dissolved satisfactorily in the reaction medium under the reaction conditions. Particularly preferred compounds are those of the alkaline earth metals, in particular of calcium and barium. It is possible to employ either only alkaline earth metal compounds, only alkali metal compounds or both alkaline earth metal compounds and alkali metal compounds in the invention as component (c).

Suitable hydrolyzable compounds are, in particular, alcoholates and amides, but also nitrates, carbonates and salts of organic acids, such as, for example, acetates, propionates and citrates. Here too, however, compounds which are preferred as component (c) are those which result, after hydrolysis, in products which can later—with the exception of the metal—be removed without leaving a residue. Of the hydrolyzable salts of the elements mentioned, as in the case of the aluminum compounds, those are particularly preferred whose anion can already take on the role of a complexing agent.

In the alcoholates and, if appropriate, the amides, the organic radicals are, in particular, alkyl groups and above all those which were defined in connection with the silicon compounds. Particularly preferred compounds are the methylates, ethylates, n-propylates, iso-propylates and butylates. The amides are preferably derived from ammonium or lower mono- and dialkylamines. Examples of these are methylamine, dimethylamine, ethylamine and diethylamine.

As stated above, however, it is also possible for hydroxides, oxides and oxide hydrates of the alkali metals and alkaline earth metals mentioned to be used according to the invention so long as they have a satisfactory solubility in the reaction medium under the given conditions. Thus, for example, calcium oxide, barium oxide, calcium hydroxide, barium hydroxide, sodium hydroxide and potassium hydroxide can be used as such, if appropriate, in particular when the reaction is carried out under acidic conditions.

Concrete examples of hydrolyzable compounds which can be used (preferably) as component (c) are: Ba(OCH$_3$)$_2$, Ba(OC$_2$H$_5$)$_2$, Ba(n-OC$_3$H$_7$)$_2$, Ba(i-OC$_3$H$_7$)$_2$, Ba(OC$_4$H$_9$)$_2$, barium nitrate, barium acetate, barium propionate and the corresponding calcium and magnesium compounds.

Apart from the compounds used in the process according to the invention as components (a) to (c), it is also possible to employ other hydrolyzable or already hydrolyzed compounds. This applies, in particular, to compounds of elements of main groups III and IV of the Periodic Table, preferably gallium, germanium, tin and lead. Concrete examples of compounds of this type are, for example, the acetates and nitrates, but also the oxides, oxide hydrates and hydroxides, so long as they are soluble in the reaction medium under the reaction conditions.

It is also possible to use hydrolyzable or hydrolyzed compounds of P, As, Sb and Bi and of subgroup metals, such as, for example, V, Cr, Mn, Fe, Ni, Zr, Co, Cu, Zn and of the lanthanides, in the process according to the invention. Concrete examples of these are, for example, the acetates and nitrates.

One of the most essential aspects of the process according to the invention is the presence during hydrolysis of the hydrolyzable compounds of a complexing agent selected from the group consisting of β-carbonyl carboxylic esters and C$_2$-C$_5$ carboxylic acids and their carboxylate ions. The complexing agent has, in particular, the task of keeping in solution the compounds which are very reactive to water, in particular the compounds of Al, but also of B, Ti, Zr and of the alkali metals and alkaline earth metals, at advanced stages of the reaction, i.e. of preventing the occurrence of precipitates. It is thereby ensured that, while a homogeneous system, which is of utmost importance for the production of glass, is maintained, the silicon compound, i.e. component (a), which is generally much less reactive to water, is hydrolyzed virtually completely or bound virtually completely to the condensates already present in the solution, which in turn prevents readily volatile silicon starting compounds or oligomers thereof escaping from the reaction system during the reaction or during later treatment at elevated temperature. This means that, for example, both a highly reactive aluminum alkoxide and a less reactive silicate can be hydrolyzed without loss of silicate and without the appearance of an aluminum-containing precipitate. Complexing agents according to the present invention are, for instance, β-carbonyl carboxylic esters of the general formula (IV)

in which R$^1$ and R$^4$ independently represent straight or branched alkyl groups having 1 to 4 carbon atoms, in particular methyl or ethyl, R$^1$ additionally may represent alkoxy groups having 1 to 4 carbon atoms, in particular methoxy and ethoxy, and R$^2$ and R$^3$, which may be identical or different, denote hydrogen, halogen and alkyl having 1 to 4 carbon atoms, in particular hydrogen.

A preferred complexing agent of formula (IV) is ethyl acetoacetate. Further suitable complexing agents are, for instance, carboxylic acids of the general formula (V)

or the corresponding carboxylate ions, in which R$^5$ represents straight or branched alkyl groups having 1 to 4 carbon atoms, optionally substituted with halogen.

Preferred complexing agents of formula (V) are acetic acid and the acetate ion.

The complexing agent according to the invention is preferably a compound which can later easily be removed from the end product, in particular without leaving a residue.

The complexing agent can be added as such; alternatively, however, one or more of the starting compounds (a) to (c) are employed already in pre-complexed form, for example as acetate. Particularly in the case of anions which act as complexing agents, the lastmentioned type of addition is preferred. Thus, for example, aluminum acetate can be used as component (b) and barium acetate be used as component (c). This use can take place alone or together with other compounds of the particular class.

The process according to the invention is optionally—and preferably—carried out in the presence of a condensation catalyst. Suitable condensation catalysts are, in particular, compounds which eliminate protons or hydroxyl ions, as well as Bronsted bases like alcoholates and amines or amino derivatives. The condensation catalyst is preferably an acid. Specific examples of condensation catalysts are organic or inorganic acids, such as nitric acid, formic acid or acetic acid, and organic or inorganic bases, such as ammonia, alkali metal hydroxides and alkaline earth metal hydroxides for example sodium hydroxide, potassium hydroxide or calcium hydroxide, alcoholates and amines which are soluble in the reaction medium, for example lower alkylamines and alkanolamines. Condensation catalysts can later be removed without leaving a residue, i.e. volatile acids and bases, in particular hydrogen chloride, glacial acetic acid, ammonia and triethylamine, are particularly preferred here. As can be seen, some of the abovementioned catalysts are identical with the compounds which can be used as component (b) and/or (c) in the process according to the invention or are produced therefrom by hydrolysis. Accordingly, independent addition of a condensation catalyst is frequently not necessary, at least in cases where the hydrolysis or condensation is to be carried out in an alkaline medium.

The solvents which can be used in the process according to the invention are preferably water, a monohydric or polyhydric alcohol or an aprotic, polar, organic solvent, such as, for example, a ketone (for example acetone or methyl ethyl ketone), an ester (for example ethyl acetate), an ether (for example tetrahydrofuran or dioxane) or an amide (for example dimethylformamide or dimethylacetamide). It is also possible to use pyridine and DMSO.

It is of course also possible to employ mixtures of the above solvents.

In particular when alkoxy compounds are employed as components (a) to (c), alcohols are the preferred solvents since alcohol is produced anyway on hydrolysis. Examples of alcohols of this type are methanol, ethanol, propanol, isopropanol, n-butanol and ethylene glycol. In the case of the solvents, it should also be possible to remove the solvent later, preferably easily and without leaving a residue.

In particular when salts are employed as components (b) and (c), a preferred solvent is water or a mixture of water and alcohol.

The solvent should in any case be of a nature such that the starting materials and, in particular, the hydrolysis or condensation products are in the form of a homogeneous solution.

Although there are no limitations for the mixing ratio of the components employed in the process according to the invention and the optimum mixing ratio in each case depends, for example, on the nature and composition of the end product desired, it is preferred according to the invention that the following mixing ratios, based on the total amount of components (a) to (c) (calculated as oxides), are observed for components (a), (b) and (c):

25 to 90% by weight, preferably 30 to 80% by weight and in particular 45 to 70% by weight, of $SiO_2$;

1 to 40% by weight, preferably 3 to 30% by weight and in particular 5 to 20% by weight, of $Al_2O_3/B_2O_3/TiO_2$;

9 to 60% by weight, preferably 17 to 50% by weight, and in particular 20 to 40% by weight, of alkali metal oxide/alkaline earth metal oxide.

The amount of the species acting as complexing agent is generally 0.1 to 3 moles, preferably 0.5 to 2.0 moles and in particular 0.5 to 1.0 moles, based on 1 mole of the Al, B and/or Ti compound(s) employed. In the case of compounds of the formula (III), up to 4 moles of complexing agent per mole of Ti may be advantageous. The solvent is preferably employed in amounts such that, on the one hand, the formation of a homogeneous solution is ensured and, on the other hand, that excessively large amounts of solvent do not have to be removed later.

The minimum amount of water to be added is the amount which is present stoichiometrically for complete hydrolysis of all the hydrolyzable groups present in the starting compounds. However, it is preferably employed in excess, for example at least a 5-fold excess and in particular at least a 10-fold excess.

As already stated above, water can, under certain preconditions, also be the solvent used or a component of the solvent system used. In other cases, the water is either added as such or introduced into the reaction system with the aid of water-containing organic or inorganic systems. In many cases, the introduction of water into the reaction mixture with the aid of moisture-charged adsorbents, for example molecular sieves, water-containing organic solvents, for example 80% ethanol, has proven particularly suitable. The water can also be added via a reaction in which water is formed, for example on ester formation from acid and alcohol (CCC=Chemically Controlled Condensation).

The optimum method of adding water is to a certain extent also dependent on the nature of the starting materials employed, in particular their reactivity to water, and on the sequence of addition of the starting materials.

In principle, the process according to the invention can be carried out in any conceivable manner, in particular as far as the sequence of addition of the individual components is concerned. It should merely be ensured that the species acting as complexing agent is already present when the more readily hydrolyzable starting materials, in particular component (b), come into contact with relatively large amounts of water. In most cases, it is also advisable not to add either the water or the readily hydrolyzable compounds in one portion, but instead in steps. An exception here is the case where salts are used as components (b) and (c) and water or a water-containing system is used as the solvent.

The temperature in the process according to the invention should generally not be significantly above room temperature, since there is the danger at higher temperatures that the hydrolysis proceeds too quickly and vigorously so that precipitates form in spite of the presence of a complexing agent. A preferred temperature range is 0° to 40° C., in particular 15° to 25° C. It may in individual cases be necessary to dissipate the heat of reaction by means of cooling agents.

After the entire amount of water necessary has been added, it is advantageous to leave or stir the batch for several more hours, for example 24 hours, at room temperature or slightly elevated temperature.

A simple way of preparing gel powder is to coagulate the resultant sol in air; this method can be employed even at room temperature and can be accelerated by increasing the temperature. Heating the resultant gel to a temperature at which the solvent used and, where appropriate, other readily volatile components (for example alcohols from the hydrolysis of the alcoholates) evaporate, for example between 70° and 130° C., then gives gel granules, which are generally easy to grind.

A preferred process for further processing of the resultant gel or salt is spray drying. This spray drying is advantageously employed to produce a powder of homogeneous grain shape and grain size distribution from solutions or suspensions. To this end, a commercially available spray drier (for example 190 Minispray from Messrs. Büchi) can be used. The grain size of the resultant gel powder can at the same time be controlled via the concentration of the sol (or gel) in the solution; the higher the concentration of the sol in the solution, the larger the grain. The spray drying is also preferably carried out at temperatures at which water, the solvent and, where appropriate, other readily volatile components evaporate. After the solvent and water have been evaporated, the weight loss of the gel powder for temperatures above approximately 150° C. is predominantly determined by pyrolysis of organic compounds and the liberation of water. In general, the weight of the gel powder remains virtually constant at temperatures above approximately 700° C. The temperature programme below, for example, can be followed for thermal compaction of the gel powder:
(i) heating to 350° C. at 80Kh$^{-1}$;
(ii) conditioning at 350° C. for 16 hours;
(iii) heating to 700° C. at 40 Kh$^{-1}$;
(iv) conditioning at 700° C. for 0.5 hour;
(v) cooling to room temperature at 150 Kh$^{-1}$.

The thermally compacted gel powders obtained in this way can be sintered together to form glass at temperatures below or only slightly above the glass-transition temperature of the particular glass. It is thereby avoided that the glass passes through temperature regions of high crystallization and seed-formation rate (these regions are markedly above the glass-transition temperature). The process according to the invention is thus suitable, in particular, for the production of glasses which have a great tendency towards crystallization, as is the case, in particular, in glasses having a high divalent (alkaline earth metal) ion content.

In addition, the process according to the invention has the advantage that homogeneous sols or gels can be synthesized under accelerated conditions without phase separation or precipitation phenomena occurring and without unreproducible stoichiometries occurring due to component loss. With complexing agents according to to the present invention, the hydrolysis of reactive components can, surprisingly, be continued until the resultant hydrolysis products rapidly bind volatile components, such as, for example, silicates which are difficult to hydrolyze, but do not at the same time tend to form agglomerates, phase separations or especially precipitates. It is thus possible to readily control systems which are difficult to control kinetically (for example systems comprising very rapidly reacting alkoxides or secondary products thereof and very slowly reacting alkoxides).

The gel powders obtainable via the process according to the invention and subsequent drying and thermal compaction are suitable, in particular, for the production of glass frits.

Examples and comparative examples below illustrate the present invention. Unless otherwise stated, the reactions were carried out at room temperature.

EXAMPLE 1

As complexing agents, 2.50 g of ethyl acetoacetate in 24 ml of isopropanol were added to 4.74 g of Al(OC$_4$H$_9$)$_3$ dissolved in 100 ml of isopropanol (the aluminum:complexing agent molar ratio here was 1:1). 0.69 ml of water in 24 ml of isopropanol was then added dropwise to this solution (corresponding to the amount of water necessary for complete hydrolysis of the remaining alkoxy groups of C$_6$H$_9$O$_3$Al(OC$_4$H$_9$)$_2$) and 14.56 g of Si(OCH$_3$)$_4$ were added dropwise. Finally, 2.93 g of barium, dissolved in 60 ml of methanol, were added dropwise, and 400 ml of water were added with stirring. The solution immediately became turbid and gelled after a short time. A sol then formed again on vigorous stirring. After a stirring time of 24 hours in a sealed vessel, the batch was spray-dried and heated to 700° C. under an oxygen atmosphere. Chemical analysis gave the following for the weight content: 31.3% of BaO, 9.4% of Al$_2$O$_3$ and 57.5% of SiO$_2$ with an ignition loss of 1.8%. This corresponds to a weight content of the oxides of 31.9% of BaO, 9.6% of Al$_2$O$_3$ and 58.5% of SiO$_2$ (theoretically 32.7% of BaO, 9.8% of Al$_2$O$_3$ and 57.5% of SiO$_2$).

This example shows that it is possible to prepare barium aluminosilicate systems of eutectic composition via hydrolysis and condensation of alkoxides.

COMPARATIVE EXAMPLE 3.14 g of barium, dissolved in 84 ml of isopropanol, were added to 4.98 g of Al(OC$_4$H$_9$)$_3$ in 60 ml of isopropanol. 13.83 g of Si(OCH$_3$)$_4$ in 50 ml of isopropanol and 8.4 ml of water in 20 ml of isopropanol were added to the resultant solution. Finally, 10 drops of concentrated nitric acid in 10 ml of water were added dropwise with stirring. After the tetramethoxysilane solution had been added, the reaction solution became milky-turbid, but became clear again on addition of the water/isopropanol solution.

After the mixture had been stirred for 5 hours in a sealed flask, the sol was spray-dried. Chemical analysis of the spray-dried gel powder gave the following for the weight content: 38.9% of BaO, 11.5% of Al$_2$O$_3$ and 20.8% of SiO$_2$ with an ignition loss of 26.1%. This corresponds to a weight content of the oxides of 53.9% of BaO, 15.9% of Al$_2$O$_3$ and 30.2% of SiO$_2$.

In spite of the use of the amount of water necessary for complete hydrolysis of the alkoxides, considerable loss of the silicon component was observed. Precipitations were observed on further addition of water.

Example 2

13.83 g of Si(OCH$_3$)$_4$ were dissolved in 80 ml of methanol. 40 ml of water (10 times the amount required for hydrolysis) and 0.15 ml of concentrated nitric acid were added to the resultant solution. After the mixture had been stirred for 30 minutes, 5.85 g of Ba(CH$_3$COO)$_2$ in 40 ml of H$_2$O and 3.79 g of Al(NO$_3$)$_3$·9H$_2$O in 80 ml of H$_2$O were added to the reaction solution. The batch rapidly became turbid and gelled after a short time. A sol formed on vigorous stirring and, after a stirring period of 24 hours, was spray-dried and heated to 700° C. under an oxygen atmosphere. Chemical analysis gave the following for the weight content: 33.4% of BaO, 8.4% of Al$_2$O$_3$ and 56.5% of SiO$_2$ with an ignition loss of 1.7%. This corresponds to a weight content of the oxides of 34.0% of BaO, 8.5% of A$_2$O$_3$ and 57.5% of SiO$_2$.

EXAMPLE 3

A Büchi spray drier (190 Minispray) was used to prepare barium aluminosilicate gel powders from the products of Examples 1 and 2. The nozzle temperature was 160° C. and the spray cylinder outlet temperature was 80° C. The solids throughput was 15 to 20 g per hour in the case of the sol prepared using barium acetate and aluminum nitrate, whereas only 5 to 8 g per hour were obtained for the alkoxide batch, corresponding to the lower concentration.

The BET surface area, determined by N2 absorption, was 1,266 m²/g for the batch containing the product of Example 1 and 3,208 m²/g for the batch containing the products of Examples 2 and 3.

EXAMPLE 4

The gel powders obtained in accordance with Example 3 were thermally compacted using the temperature program indicated above. After the gel powders obtained by air drying were thermally compacted at 700° C., glass-like powders were obtained.

Whereas the BET surface area for the gel powder calcined at 700° C. (from the batch of Example 1) was 191 m²/g, a specific surface area of 3 m²/g was measured after thermal treatment under oxygen at 950° C. for 5 hours. This corresponds to the value for a molten and ground glass. Even at a hold time of 1 hour at 1,100° C., the compacted pressings had been converted completely into the glass state.

What is claimed is:

1. A process for the production of substantially homogeneous condensation products, which are capable of being converted to glass by hydrolytic condensation of compounds of elements whose presence in the glass end product is desired, which comprises bringing a solution containing:

(a) at least one compound of the formula (I):

$$SiR_4 \quad (I)$$

in which radicals R are identical to or different from each other, and each R is a hydrolyzable group or hydroxyl group, or an oligomer derived therefrom or a combination thereof;

(b) at least one compound of the formula (II) or (III):

$$MR'_3 \quad (II)$$

$$TiR'_4 \quad (III)$$

in which M represents Al or B; and the radicals R', which are identical to or different from each other, are each a hydrolyzable group or hydroxyl group or a hydrolyzable aluminum salt or an oligomer derived from said compounds, or a combination thereof; and (c) at least one hydrolyzable compound or at least one hydroxide, oxide or oxide hydrate of an element selected from the group consisting of lithium, sodium, potassium, rubidium, cesium, beryllium, magnesium, calcium, strontium and barium; into contact with at least an element of water stoichiometrically necessary for complete hydrolysis of said hydrolyzable groups present, in the presence of a complexing agent selected from the group consisting of β-carbonyl carboxylic esters, and C2–C5 carboxylic acids and their carboxylate ions, whereby the hydrolysis of said hydrolyzable compounds is effected substantially without loss of less reactive volatile starting compounds, and substantially without formation of precipitates from more reactive starting compounds during hydrolysis.

2. The process as claimed in claim 1, wherein the solution further contains hydrolyzable or already partially hydrolyzed or condensed compounds of one or more elements of main groups III and IV of the Periodic Table.

3. The process as claimed in claim 1, wherein the complexing agent is selected from the group consisting of ethyl acetoacetate, acetic acid and acetate ion.

4. The process as claimed in claim 1, wherein the complexing agent is used in the amount of from 0.5 to 1.0 moles, based on 1 mole of the compounds(s) of Al, B or Ti or a mixture thereof.

5. The process as claimed in claim 1, wherein components (a), (b) and (c) are employed in the following relative amounts, calculated as oxides: 25 to 90% by weight of $SiO_2$, 1 to 40% by weight of $Al_2O_3/B_2O_3/TiO_2$ and 9 to 60% by weight of an alkali metal oxide or alkaline earth metal oxide or a mixture thereof.

6. The process as claimed in claim 1, wherein, in the compound of the formula (I), the groups R represent hydroxy, alkoxy, acyloxy, or $NR''_2$, wherein R'' is hydrogen or alkyl or both, or a combination thereof.

7. The process as claimed in claim 1, wherein component (b) comprises at least one compound of the formula (II), in which M represents Al, and R' represents alkyl, alkoxy, acyloxy or hydroxyl or a mixture thereof.

8. The process as claimed in claim 1, wherein component (c) is an alkaline earth metal compound.

9. The process as claimed in claim 1, wherein an excess of water is used for the hydrolysis.

10. The process as claimed in claim 1, wherein, after the addition of water, the reaction mixture is stirred for several hours at room temperature and then at elevated temperature, whereby volatile and volatilizable components are removed.

11. The process as claimed in claim 1, wherein said less reactive, starting compound is a silicon compound, and said more reactive, starting compound is a compound of Al, B, Ti, Zr and of an alkaline earth metal or alkali metal.

12. The process as claimed in claim 2, wherein said elements from main groups III and IV are gallium, germanium, tin and lead.

13. The process as claimed in claim 5, wherein components (a), (b) and (c) are employed in the following relative amounts, calculated as oxides: 30 to 80% by weight of $SiO_2$, 3 to 30% by weight of $Al_2O_3/B_2O_3/Tio_2$ and 18 to 50% by weight of an alkali metal oxide or alkaline earth metal oxide or a mixture thereof.

14. The process as claimed in claim 6, wherein R is alkoxy or hydroxyl or both.

15. The process as claimed in claim 7, wherein R' is alkoxy or hydroxyl or both.

16. The process as claimed in claim 9, wherein at least a 5-fold excess of water is used.

17. The process as claimed in claim 10, wherein said elevated temperature is in excess of 80° C.

18. A condensation product obtainable in accordance with the process of claim 1.

* * * * *